United States Patent [19]

Hoyle et al.

[11] Patent Number: 5,043,952
[45] Date of Patent: Aug. 27, 1991

[54] MONOPOLE TRANSMITTER FOR A SONIC WELL TOOL

[75] Inventors: David C. Hoyle, Houston; Albert H. Wignall, Friendswood; Jeffrey B. Aron, Houston, all of Tex.; Anthony K. Booer, Cambridge, United Kingdom

[73] Assignee: Schlumberger Technology Corporation, Houston, Tex.

[21] Appl. No.: 480,435

[22] Filed: Feb. 15, 1990

Related U.S. Application Data

[62] Division of Ser. No. 325,405, Mar. 17, 1989.

[51] Int. Cl.⁵ .............................................. H04R 17/00
[52] U.S. Cl. .................................... 367/159; 181/106; 181/105; 310/369; 310/334
[58] Field of Search ................. 367/159, 912, 157, 35; 181/106, 105, 102; 310/334, 369; 381/190; 166/249

[56] References Cited

U.S. PATENT DOCUMENTS

| | | | |
|---|---|---|---|
| 3,277,436 | 10/1966 | Fitzgerald et al. | 367/159 |
| 3,332,057 | 7/1967 | Pavey | 367/159 |
| 3,583,677 | 6/1971 | Phillips | 367/162 |
| 4,701,892 | 10/1987 | Anderson | 367/35 |

Primary Examiner—Deborah L. Kyle
Assistant Examiner—J. Woodrow Eldred
Attorney, Agent, or Firm—Henry N. Garrana; John H. Bouchard

[57] ABSTRACT

A monopole transmitter for a sonic well tool includes an axial tube, a piezoceramic cylinder surrounding the axial tube, an endcap disposed at each end of and firmly contacting the cylinder, and an apparatus for holding the endcaps firmly against the axial tube. The endcaps firmly contact the axial tube without simultaneously contacting an upper bulkhead. The apparatus may include spring washers disposed between the bulkhead and at least one endcap, or it may include a spring disposed between a nodal mount and each endcap. A nodal mounting tube may be disposed around the axial tube, a ring being disposed at each end of the nodal mounting tube, each ring being disposed outside of the cylinder, the apparatus including a spring disposed between each ring and an endcap outside of the cylinder for biasing the endcaps in tension against a ring thereby holding each endcap firmly in contact against the axial tube.

6 Claims, 14 Drawing Sheets

TO POWER AMP (1) OF FIG. 4B

FIG. 3A2
FIG. 3A1

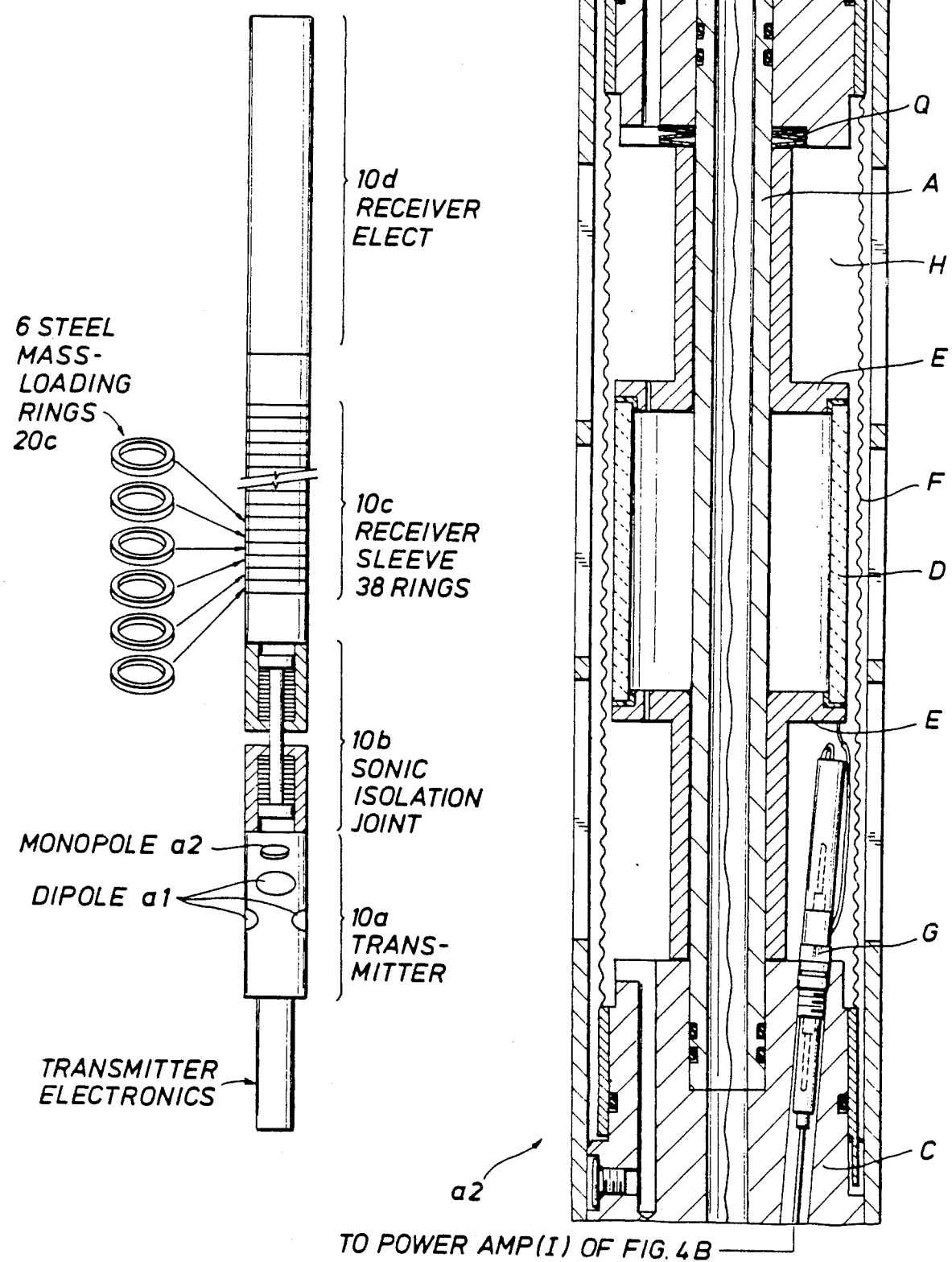

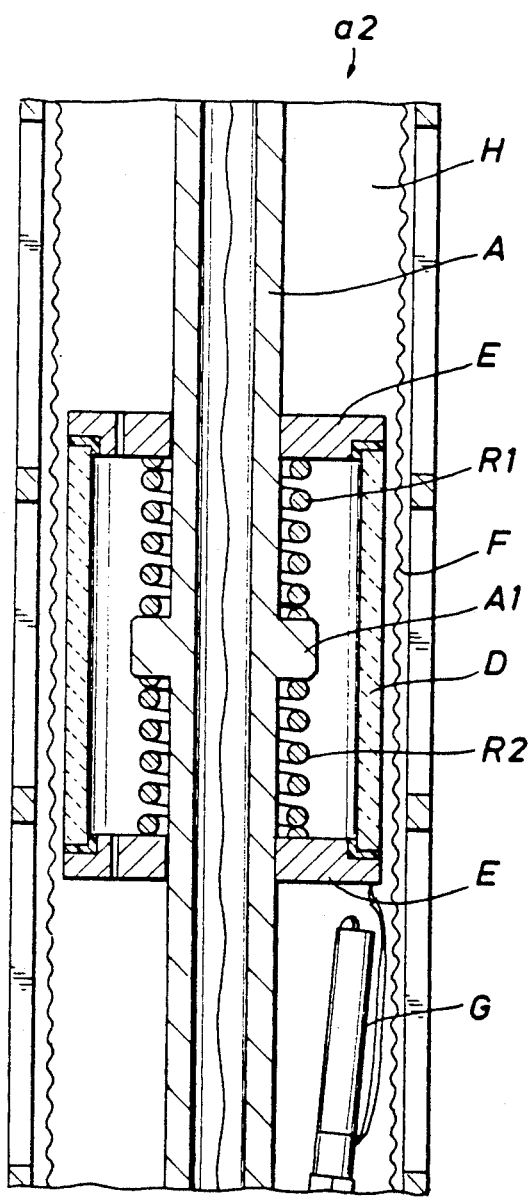 
FIG.4A1
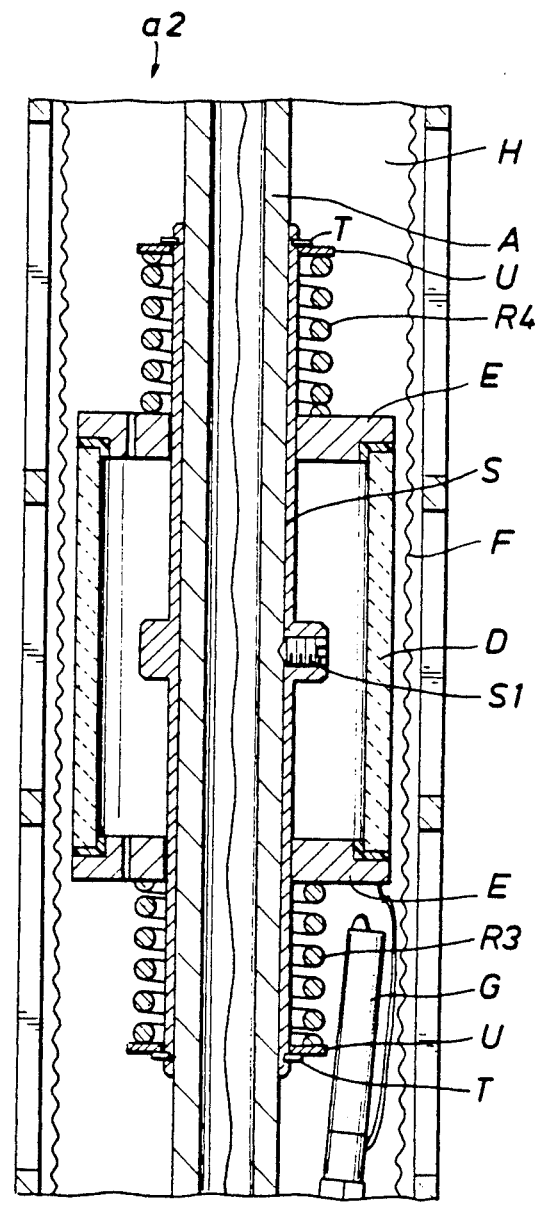 
FIG.4A2

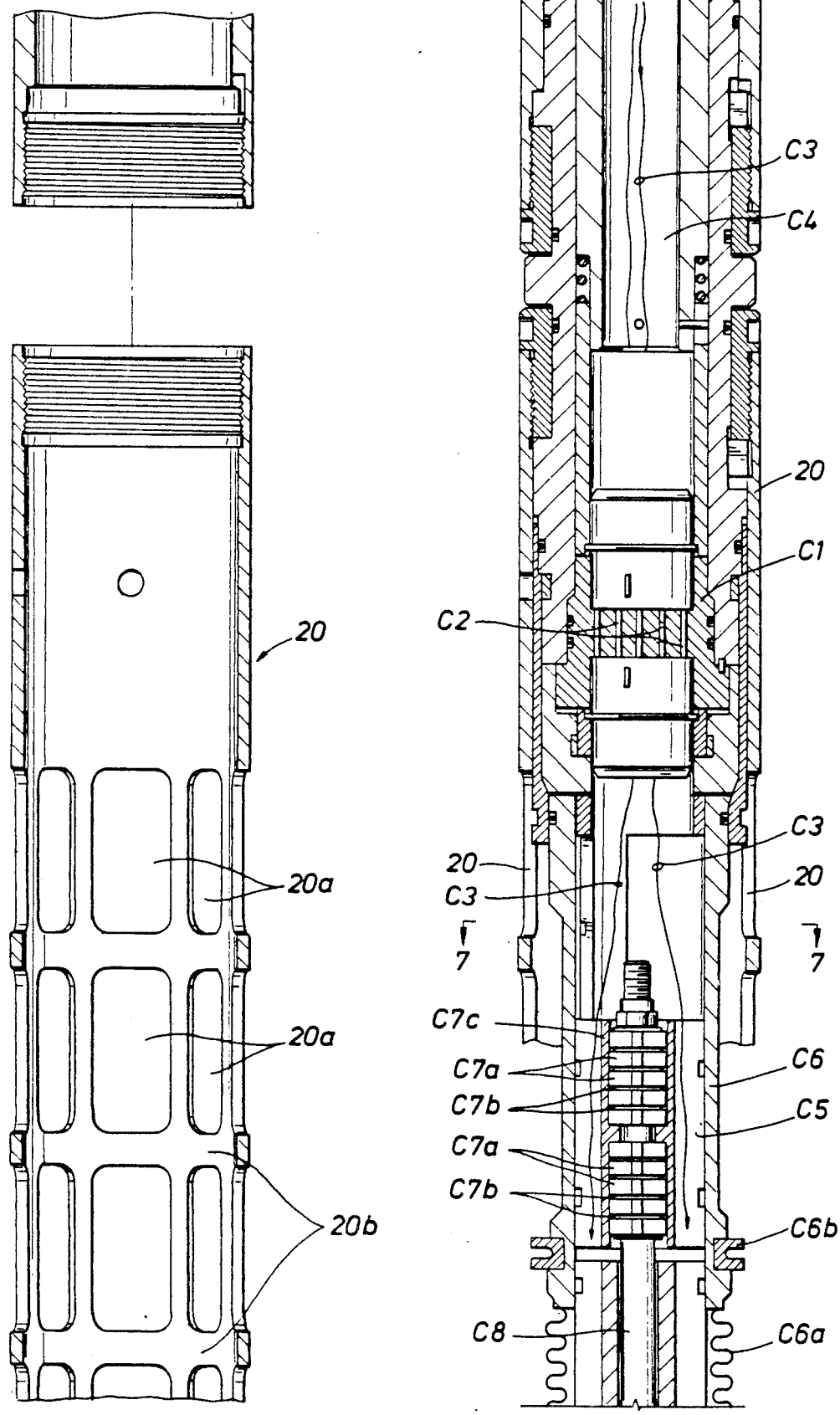

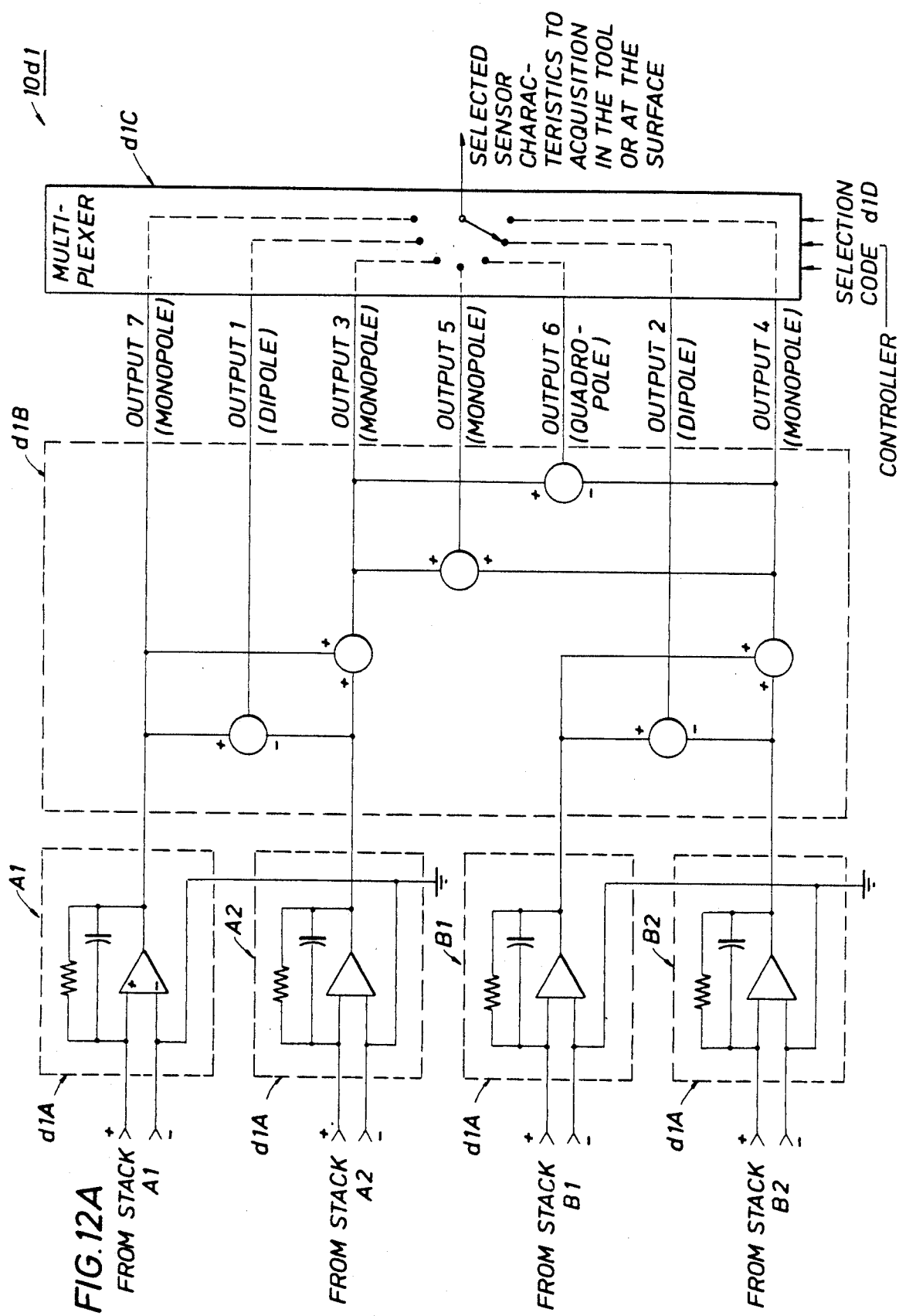

MONOPOLE TRANSMITTER FOR A SONIC WELL TOOL

This is a division of application Ser. No. 07/325,405 filed Mar. 17, 1989.

BACKGROUND OF THE INVENTION

The subject matter of this invention relates to sonic well tools, and, more particularly, to a transmitter and receiver array for a sonic well tool.

Some well tools are used in boreholes of oil wells for the purpose of determining if oil exists in a formation surrounding the borehole. Some well tools are sonic in nature, in that they transmit a sonic compressions or shear wave into the formation and receive the sonic compressional or shear waves from the formation. One such prior art sonic well tool is known as the "Array Sonic Service" tool, or a "Sonic Digitizing Tool (SDT)". A partial view of the SDT tool, illustrating only the receiver section of the tool, is shown in FIG. 3A of the drawings. The SDT tool included a transmitter section, but each of the transmitters of the SDT tool were monopole transmitters. There were no dipole transmitters in the SDT array sonic service tool. Consequently, the data received by the SDT tool receivers comprised solely of monopole wave data. Furthermore, the SDT tool was not designed to attenuate or delay, to any substantial degree, flexural and compressional waves propagating along the body of the tool to the receivers. Consequently, the SDT tool body of the tool to the receivers. Consequently, the SDT tool receivers would sense monopole related waves, propagating along the borehole formation, but would also sense undesirable disturbances in the tool created by flexural and compressional waves propagating along the body of the tool. The SDT tool did delay, to some extent, compressional waves propagating along the body of the tool, but did not appear to delay flexural waves propagating along such tool. Therefore, a new sonic tool is needed to transmit sonic dipole as well as monopole related waves into a surrounding borehole formation, to be capable, at a receiver end of such tool of receiving sonic monopole waves when the sonic tool transmits sonic monopole related waves into the borehole formation and of receiving sonic dipole waves when the sonic tool transmits sonic dipole related waves into the borehole formation, and to attenuate and delay, to a maximum extent possible, all compressional and flexural waves propagating along the inner and outer bodies of the sonic tool

SUMMARY OF THE INVENTION

It is a primary object of the present invention to disclose a new design for a sonic well tool.

It is a further object of the present invention to disclose a new sonic well tool which includes both a sonic monopole transmitter section and a sonic dipole transmitter section.

It is a further object of the present invention to provide a new design for a sonic monopole transmitter.

It is a further object of the present invention to disclose a new design for a sonic well tool receiver which interacts correctly with the sonic monopole and dipole transmitters in the tool.

It is further object of the present invention to disclose a new sonic well tool receiver which will receive sonic monopole compressional and shear waves from a formation when the sonic monopole transmitter is used, and which will receive sonic dipole compressional and shear waves from the formation when the sonic dipole transmitter is used.

It is another object of the present invention to disclose a new sonic well tool receiver capable of sensing a plurality of compressional and shear waves propagating longitudinally along a borehole formation, which originated from a sonic well tool transmitter, without also sensing a set of flexural and compressional waves propagating longitudinally along the body of the tool.

It is a further object of the present invention to disclose a new sonic well tool receiver which includes a new flexural and compressional wave attenuation and delay apparatus for attenuating and delaying the propagation of compressional and flexural waves as such waves propagate toward the tool receiver from either of two directions, from a direction above the receiver, and from a direction below the receiver.

In accordance with these and other objects of the present invention, a new sonic transmitter array comprises at least one dipole transmitter and at least one monopole transmitter. In the illustrated embodiment, a plurality of dipole transmitters are disposed in the sonic tool, each dipole transmitter being positioned, angularly, by approximately 90 degrees from its adjacent dipole transmitter. A new sonic receiver comprises a hydrophone array, a compressional and flexural wave attenuator disposed along a centrally disposed metal support rod, on a top end of a sonic well tool, for attenuating compressional and flexural waves propagating longitudinally along the metal support rod toward the hydrophone array, a compressional and flexural wave delay apparatus disposed along an inner housing, on a top end of the sonic well tool, for delaying, in time, the compressional and flexural waves propagating along the inner housing of the tool toward the hydrophone array, a further compressional and flexural wave delay apparatus disposed along the inner housing, on a bottom end of the sonic well tool, for delaying, in time, the compressional and flexural waves propagating along the inner housing of the tool toward the hydrophone array, a differential volume compensator disposed on the bottom end of the tool for changing the volume of the sonic well tool in response to changes in volume of oil disposed in the tool, the oil volume changing in response to changes in temperature and pressure in the borehole, and a plurality of mass loading rings disposed around an outer housing of the tool for attenuating flexural vibrations propagating longitudinally along the outer housing of the tool. The flexural and compressional wave attenuator comprises a plurality of rubber like discs interleaved with a plurality of metal like discs for further attenuating flexural and compressional waves propagating longitudinally along the metal support rod of the tool. The hydrophone array includes a plurality of hydrophone sets, each hydrophone set including at least one pair of hydrophones, and, preferably, at least two pairs of hydrophones, each hydrophone of a pair being disposed opposite its twin hydrophone in the hydrophone pair of the particular hydrophone set for sensing the existence of compressional and shear waves propagating longitudinally along the borehole. In an illustrated embodiment, if a section were taken transversely through the sonic tool and through a hydrophone set, four hydrophones would be disposed within the section, each hydrophone being disposed at substantially 90 degree angles with respect to each of its adjacent hydrophones. Each hydrophone comprises a plurality of metaniobate piezo-ceramic discs interleaved with a corresponding plurality of conducting plates or metal like discs, connected together by a bolt disposed longitudinally therethrough. Every first, third, fifth, . . . metal-like disc is connected to a first terminal, and every second, fourth, sixth, . . . , metal like disc is connected to a second terminal. When a pressure wave is detected by the hydrophone, propagating longitudinally along the borehole, each of the piezo-ceramic discs compress thereby creating a voltage potential across each ceramic disc. The potential for the first, third, fifth, . . . discs are added together and appear at the first terminal of the hydrophone, and the potential for the second, fourth, sixth, . . . discs are added together and appear at the second terminal of the hydrophone. The potential between the first and second terminals of the hydrophone represents the compressional or shear wave propagating longitudinally along the borehole. The potential is also indicative of the presence or absence of oil in the formation of the borehole. Since both dipole and monopole transmitters are used in the new sonic tool of the present invention, a switching network is connected to each of the hydrophones of each hydrophone set of the hydrophone array, for the purpose of selecting monopole compressional and/or shear waves from the formation when the monopole transmitter is used, and for selecting dipole compressional and/or shear waves from the formation when the dipole transmitter is used.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 4 illustrates a sonic well tool in accordance with the present invention including a transmitter section, a sonic isolation joint (isolator) section, and a receiver section of the present invention;

FIGS. 4A illustrates a detailed construction of the sonic monopole transmitter shown in FIG. 4;

FIGS. 4A1 and 4A2 illustrate other embodiments of the monopole transmitter of FIG. 4A;

FIG. 12A illustrates a switching network connected to the typical hydrophone set shown in FIG. 12;

DETAILED DESCRIPTION OF THE PREFERRED EMBODIMENT

Figures 1, 2, 3:
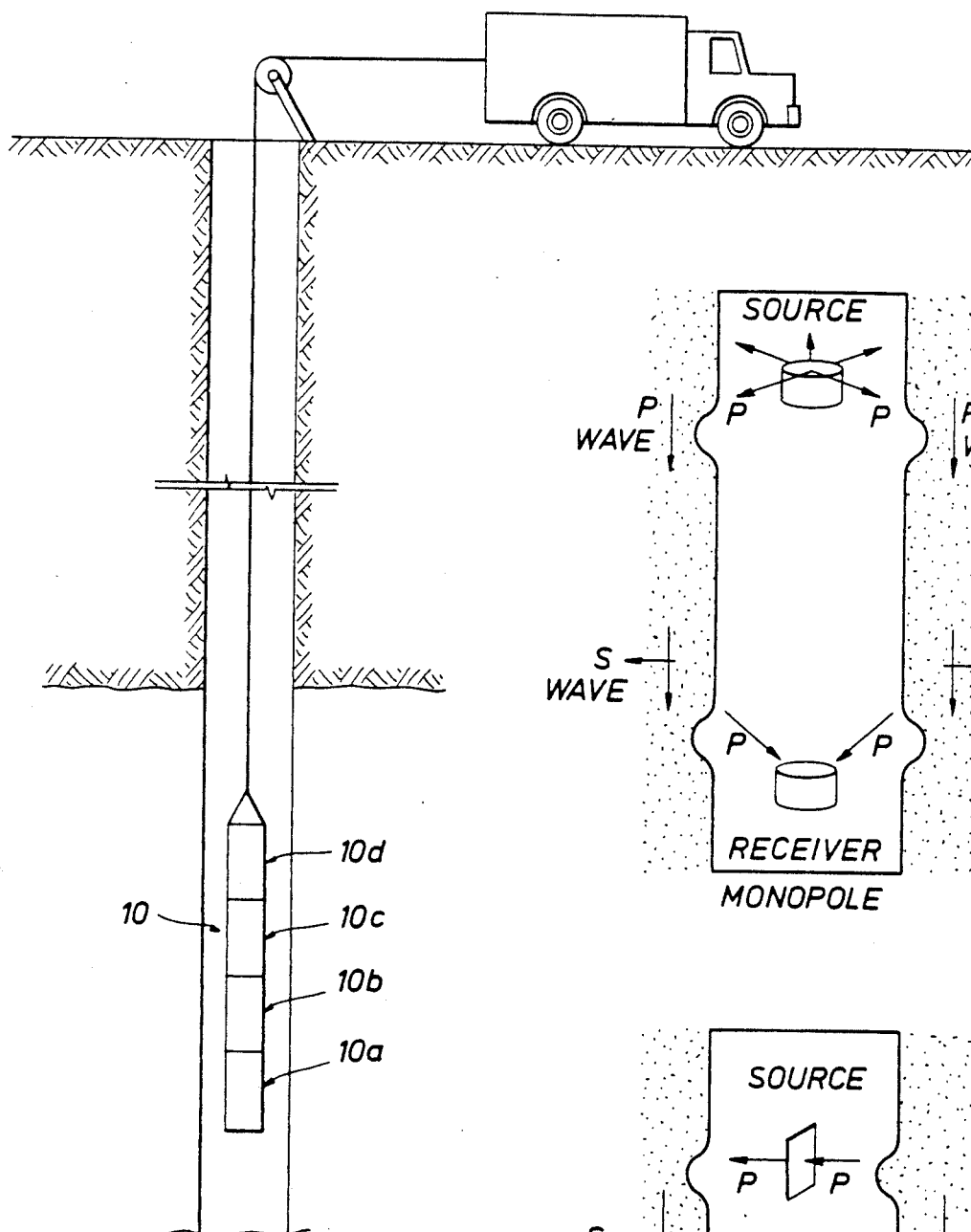
FIG. 1 illustrates a borehole having a sonic tool disposed therein, the tool including a new sonic receiver in accordance with the present invention.
FIGS. 2 through 3 illustrate the difference between a sonic monopole tool and a sonic dipole tool.

Referring to FIG. 1, a well logging truck lowers a sonic dipole tool 10 into the borehole of an oil well. The sonic dipole tool 10 comprises a transmitter section 10a in accordance with the present invention, a Sonic Isolation Joint (SIJ) 10b, a receiver section or hydrophone array 10c in accordance with the present invention, and an electronics cartridge 10d.

Referring to FIG. 2, a sonic monopole transmitter produces positive compressional waves on both sides of the transmitter via volumetric expansion and contraction of the tool. Compressional waves are generated in the formation, as illustrated, these compressional waves propagating longitudinally along the axis of the borehole.

Referring to FIG. 3, a sonic dipole tool transmitter produces a positive shear wave on one side of the tool, and a negative shear wave on the other side of the tool. A moving plate (representing an asymmetric sound source) of the sonic dipole tool transmitter produces a positive shear wave on one side of the tool and a negative shear wave on the other side of the tool. No net volume change is produced. A positive shear wave propagates longitudinally on one side of the borehole and a negative shear wave propagates longitudinally on the other side of the borehole.

Figure 3A:
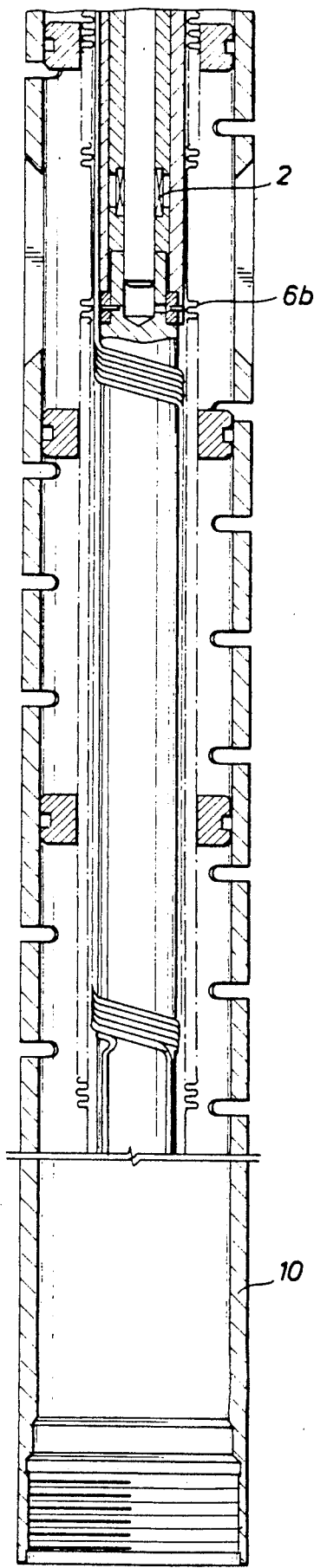
FIG. 3A illustrates a partial view of a prior art sonic well tool receiver.
Figure 3A:
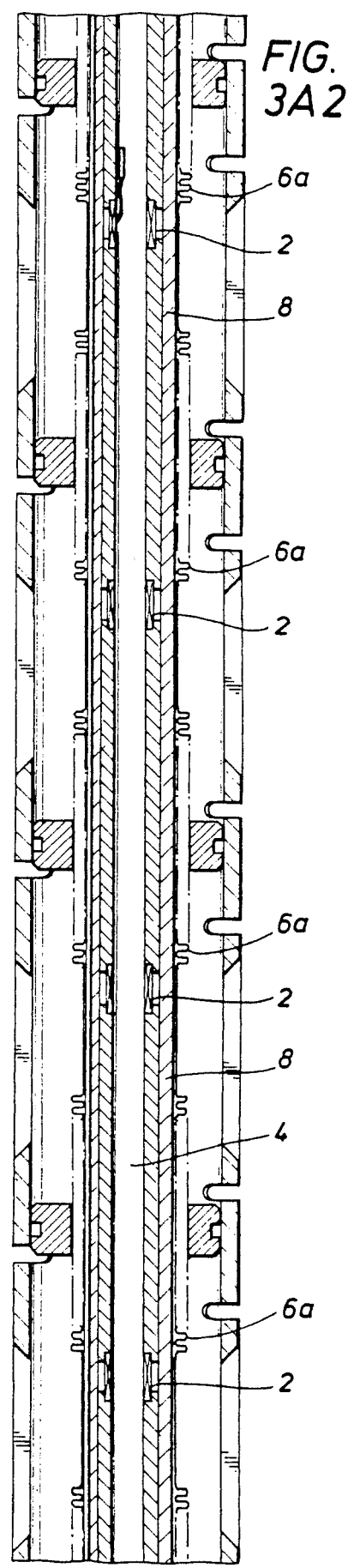

Referring to FIG. 3A, including FIGS. 3A1 and 3A2, a partial construction of a prior art sonic well tool receiver section is illustrated.

In FIG. 3A, a partial construction of the receiver section of the prior art "Array Sonic Service", or "SDT" sonic well tool, discussed in the background of the invention section of this application, is illustrated. The SDT tool of FIG. 3A includes a plurality of receiver sensors 2 disposed around a metal, center support rod 4, the receiver sensors 2 sensing the existence of sonic monopole compressional waves, similar to monopole waves of FIG. 2, propagating along the borehole formation. The SDT tool of FIG. 3A possessed only a monopole transmitter section. Therefore, the receiver sensors 2 sensed only monopole compressional waves (as shown in FIG. 2) propagating along the borehole formation. A bellows section 6a is interposed between each receiver sensor 2, along an inner housing, for delaying compressional waves (not flexural waves) propagating along the inner housing 8. The bellows section 6a appears to fail in delaying the flexural waves propagating along the inner housing 8 due to the fairly thick width (transverse) dimension of the bellows 6a, the bellow's width being on the order of 20 mils in thickness. As will be discussed in more detail below, a bellows, such as bellows 6a of FIG. 3A, should be thin in width (on the order of 10 mils in thickness) in order to successfully delay flexural waves propagating along the inner housing 8. A further bellows section 6b is disposed near one end 10 of the SDT tool for delaying compressional (not flexural) waves propagating along the housing 10 originating from the one end 10 of the tool.

Referring to FIG. 4, a sonic well tool, incorporating a sonic receiver of the present invention, is illustrated. In FIG. 4, the sonic well tool comprises a transmitter section 10a, a sonic isolation joint (SIJ) 10b, a receiver section 10c, and an electronics section 10d. The receiver section 10c includes a plurality of mass loading rings snugly surrounding the outer housing of the sonic tool of FIG. 4 The mass loading rings will be disclosed in more detail with reference to FIG. 5F of the drawings. The transmitter section 10a includes a plurality of dipole transmitters a1 disposed within the tool and at least one monopole transmitter a2 also disposed within the same tool. A dipole transmitter a1 is disposed, angularly, by approximately 90 degrees with respect to its adjacent dipole transmitters a1. The sonic monopole transmitter a2 produces the compressional and shear wave effect illustrated in FIG. 2 of the drawings and is disclosed in more detail below with reference to FIG. 4A of the drawings. The sonic dipole transmitter a1 produces the compressional and shear wave effect illustrated in FIG. 3 of the drawings and is disclosed in U.S. Pat. No. 4,862,991 which corresponds to application Ser. No. 243,852, filed Sept. 13, 1988, entitled "Sonic Well Logging Tool Transmitter", the disclosure of which is incorporated by reference into the specification of this application. The Sonic Isolation Joint (SIJ) 10b is an attenuation member comprising a plurality of rubber like washers interleaved with a corresponding plurality of metal washers and is designed to attenuate compressional and flexural waves propagating longitudinally along the body of the tool. The SIJ 10b is disclosed in U.S. Pat. No. 4,872,526, which corresponds to application Ser. No. 220,777, filed July 18, 1988, entitled "Sonic Well Logging Tool Longitudinal Wave Attenuator", the disclosure of which is incorporated by reference into the specification of this application.

Figure 4C:
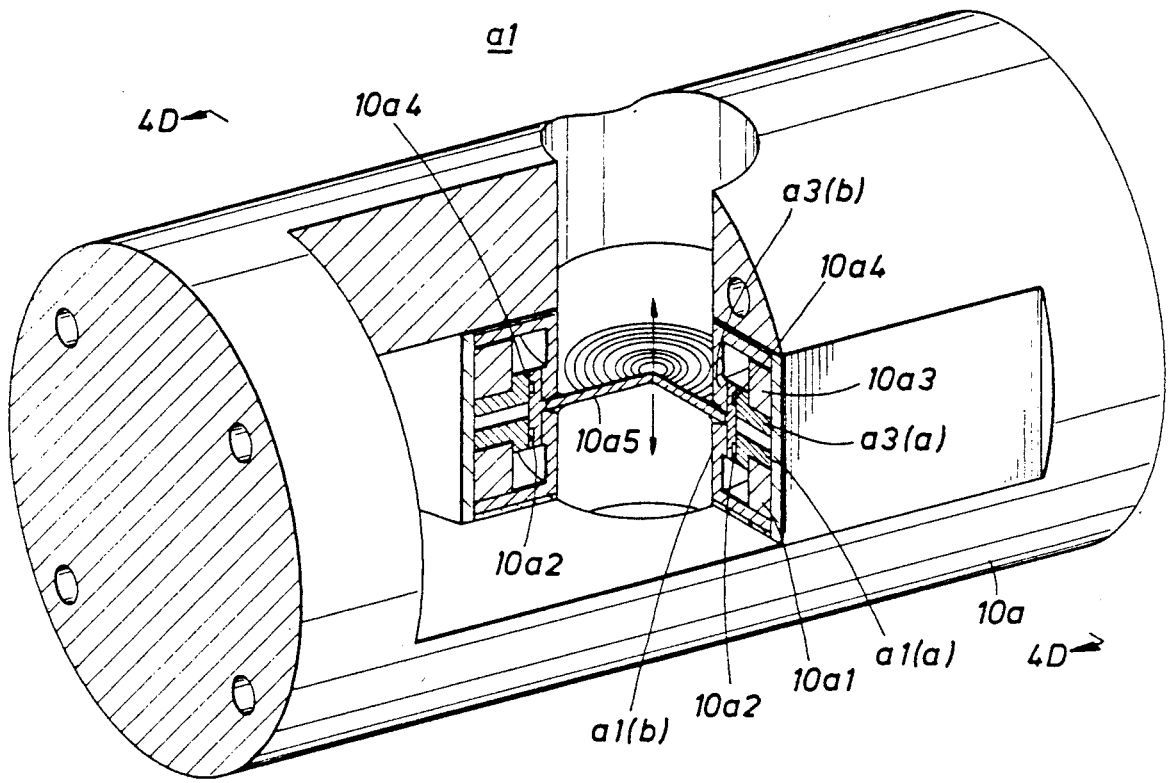
FIGS. 4C–4D illustrate a construction of the sonic dipole transmitter shown in FIG. 4.
Figure 4D:
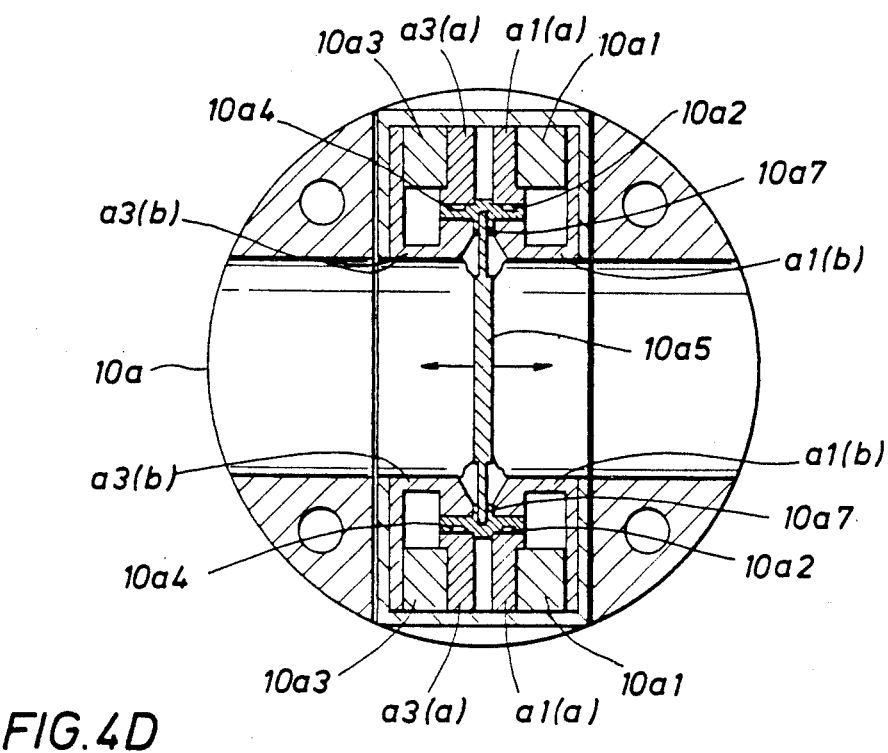
Figure 4B:
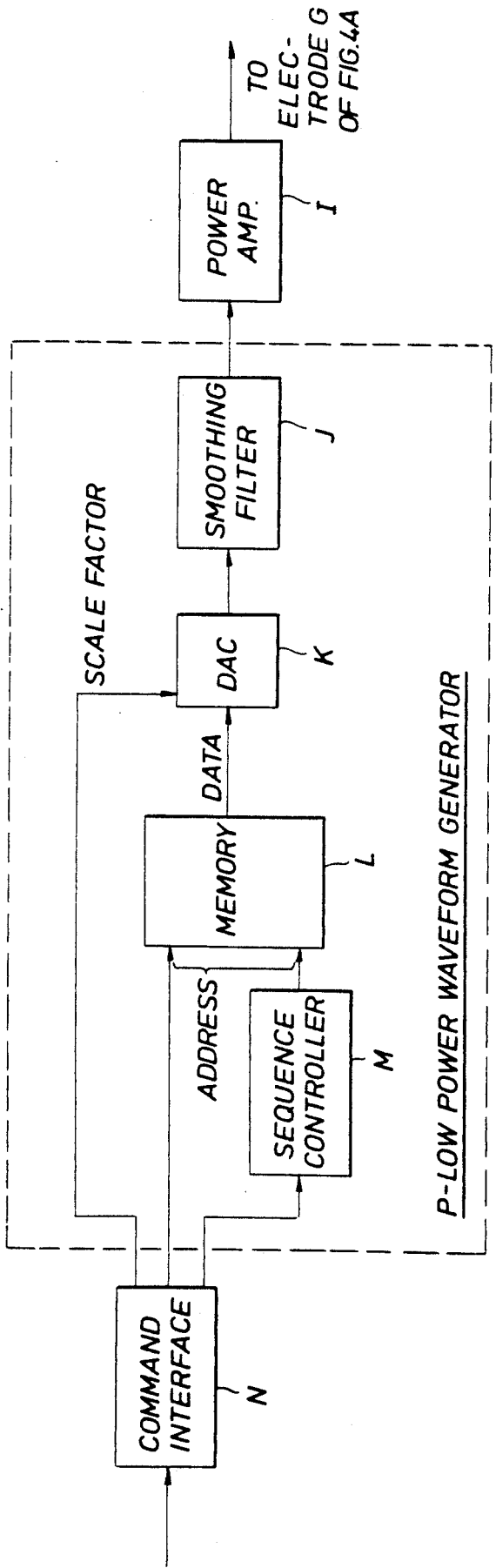
FIG. 4B illustrates a construction of an electronics section connected to the sonic monopole transmitter of FIG. 4A.

Referring to FIGS. 4A and 4B, a detailed construction of the sonic monopole transmitter a2 shown in FIG. 4 is illustrated.

In FIG. 4A, an axial tube A is held in place by an upper bulkhead B and a lower bulkhead C. A piezoceramic cylinder D surrounds the axial tube A and is held in its co-axial position relative to the axial tube A by endcaps E disposed at each of its ends in order that, at low frequencies, radiation from the inside of the cylinder D does not cancel the radiation from the outside of cylinder D. Endcaps E contact upper bulkhead B via spring washers Q. Spring washers Q will absorb any axial expansion of cylinder D transmitted to upper bulkhead B via endcaps E. Nevertheless, a compressional wave will be transmitted into bulkhead B via spring washer Q and endcap E. A corrugated container F surrounds the piezo-ceramic cylinder D and attaches to the upper and lower bulkheads B,C. The cylinder D is held in an oil-filled cavity H, the oil being held in the cavity H by the corrugated container F, the corrugations allowing for differential changes in volume between the mud outside and the oil inside the corrugated container F. A power amplifier is attached to the piezoceramic cylinder D via a electrode G for polling the cylinder D radially. The electrode G is attached to the inner and outer surfaces of the piezo ceramic cylinder D for applying a voltage to the cylinder D which causes the cylinder D to expand in length and radius, thereby causing a volumetric expansion of the cylinder resulting in propagation of compressional and shear waves along the borehole in the manner illustrated in FIG. 2 of the drawings. In FIG. 4B, electrode G is attached to a power amplifier shown in FIG. 4B. The power amplifier I is attached to a smoothing filter J. The input of the smoothing filter J is attached to a DC to AC converter (DAC) K. A memory L is connected to an input of the DAC K, the memory L being addressed by inputs from the sequence controller M and a command interface N. The command interface N also provides a scale factor to the DAC K. The sequence controller M, the memory L (which is actually a read only memory ROM), the DAC K, and the smoothing filter J together constitute a low power waveform generator P. In operation, referring to FIGS. 4A and 4B, the voltage applied to the piezo-ceramic cylinder D originates from the power amplifier I, which amplifies a voltage synthesized from the low power waveform generator P. Commands from the borehole surface select a data series stored in memory L; the data series (being a plurality of DC voltages) is read from the memory L and is converted into an alternating current (AC) voltage via the DC to AC converter (DAC) K and the smoothing filter J. This AC voltage is applied to the piezo-ceramic cylinder D for producing the volumetric expansion and contraction of the cylinder and thereby producing the effect on the borehole walls shown in FIG. 2 of the drawings.

Referring to FIG. 4A1 and 4A2, alternate embodiments of the monopole transmitter of FIG. 4A are illustrated.

In FIG. 4A, when cylinder D expands axially in response to a voltage being applied thereto via electrode G, endcaps E, which contact upper bulkhead B via spring washers Q, transmit a compressional and perhaps flexural wave into the bulkhead B. This compressional wave is ultimately recorded by the sensors in receiver 10c. Since one object of the present invention is to attenuate and delay, to the maximum extent possible, undesired compressional and flexural waves propagating along the body of the tool before such waves reach the receiver 10c, another embodiment of the monopole transmitter a2 is needed.

In FIG. 4A1, another such embodiment of the monopole transmitter a2 is illustrated. Piezo ceramic cylinder D is held in its coaxial position relative to axial tube A by new endcaps E. The new endcaps E differ from endcap E shown in FIG. 4A, in that the new endcaps E do not extend to upper bulkhead B and therefore do not contact the upper bulkhead B. Consequently, in FIG. 4A1, no spring washers Q are used. In FIG. 4A1, axial tube A includes a nodal mount A1. A spring R1 is disposed on one side of nodal mount A1 and spring R2 is disposed on the other side of nodal mount A1. The spring R1 contacts endcap E on one side of nodal mount A1 and spring R2 contacts endcap E on the other side of nodal mount A1. The biasing force of spring R1 between nodal mount A1 and one endcap E and between nodal mount A1 and the other endcap E holds cylinder D in its coaxial position relative to axial tube A. As a result, when cylinder D expands axially, in response to a voltage being applied thereto via electrode G, no contact will be made with upper bulkhead B and no compressional wave will be transmitted to the bulkhead B or any other part of the sonic tool of this invention.

In FIG. 4A2, still another embodiment of the monopole transmitter a2 is illustrated. The same new endcaps are utilized in this embodiment as was used in the FIG. 4A1 embodiment. The new endcaps E of the FIG. 4A1 and 4A2 embodiments do not contact the upper bulkhead B, as they did in the FIG. 4A embodiment. Therefore, when the cylinder D expands axially and radially in response to a voltage being applied thereto via electrode G, no compressional or flexural wave is transmitted to the body of the tool. In FIG. 4A2, a different method of holding piezoceramic cylinder D in its coaxial position relative to axial tube A is utilized. In FIG. 4A2, a nodal mounting tube S is located and positioned coaxially around axial tube A, the nodal tube S including set screws S1. A snap ring T is located at both ends of the nodal mounting tube S, and a flat washer U rests on the snap ring T at both ends of the nodal mounting tube S. A spring R3 is located between flat washer U and endcap E on one side of cylinder D and spring R4 is located between flat washer U and endcap E on the other side of cylinder D, as shown in FIG. 4A2. As a result, cylinder D is held in its coaxial position relative to axial tube A in response to the biasing force of spring R3 on one endcap E and the biasing force of spring R4 on the other endcap E. When cylinder D expands axially and radially in response to a voltage being applied thereto via electrode G, since no contact is made with upper bulkhead B, no compressional or flexural wave will be transmitted to the body of the sonic tool of the present invention.

Referring to FIGS. 4C and 4D, a three dimensional view of a dipole transmitter a1 shown in FIG. 4 is illustrated. The dipole transmitter a1 is fully set forth in prior pending application Ser. No. 243,852, filed Sept. 13, 1988, entitled "Sonic Well Logging Tool Transmitter", the disclosure of which has already been incorporated by reference into this specification.

In FIGS. 4C and 4D, the transmitter a1 includes a first magnet 10a1 having a north pole a1(a) and a south pole a1(b); a first coil 10a2 disposed between the north pole and the south pole of the first magnet; a second magnet 10a3 having a north pole a3(a) and a south pole a3(b); a second coil 10a4 disposed between the north pole and the south pole of the second magnet 10a3; a rigid piston 10a5 centrally disposed along the longitudinal axis of the tool between the first magnet 10a1 and the second magnet 10a3; a rubber spring 10a7; and a set of wires connected to the first coil 10a2 and the second coil 10a4. The wires are connected to both the first and second coils 10a2,10a4 because both coils are energized simultaneously by a current originating from a separate power source. In operation, a current flowing through the wires energizes both coils 10a2 and 10a4 simultaneously. Since both coils are disposed in the magnetic field created by the two magnets 10a1/10a3, a "dual force" is exerted on the piston 10a5. Due to the flexing of the rubber spring 10a7, the piston 10a5 moves, in its entirety, in a direction transverse to the longitudinal axis of the sonic tool. This causes a sonic shear wave to begin propagating in the formation surrounding the borehole, a positive wave being formed on one side of the tool piston, a negative wave being formed on the other side of the tool piston, as illustrated in FIG. 3 of the drawings.

Figure 6:
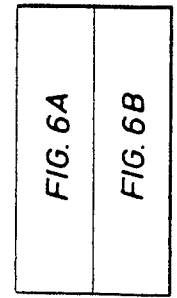
FIG. 6, inclusive of FIGS. 6A–6B, illustrates the outer housing which surrounds the sonic receiver section of FIGS. 5A–5F.
Figure 6B:
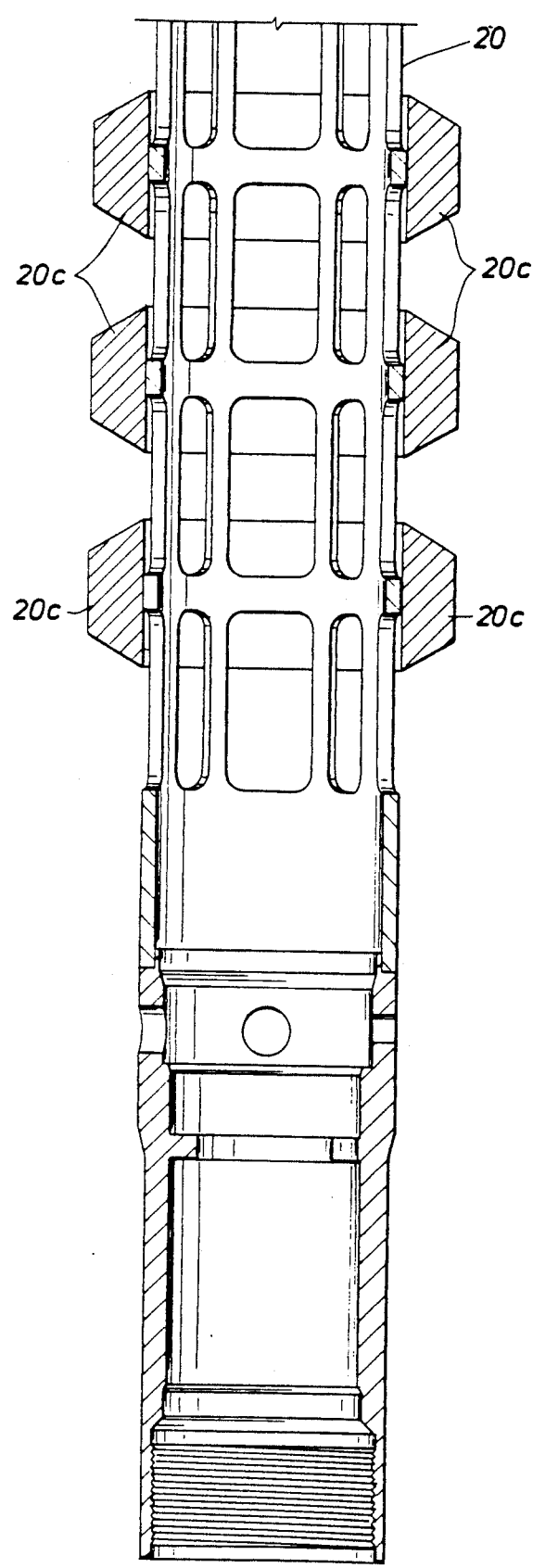

Referring to FIGS. 6A-6B, the outer housing of the sonic well tool shown in FIG. 4 is illustrated. In FIG. 6A, an outer housing 20 surrounds the receiver section 10c of the tool shown in FIG. 4 and includes a continuous pattern of interruptions disposed through the housing for reducing secondary acoustic noise generation near the sonic receiver transducer of the present invention. The continuous pattern of interruptions further includes a plurality of holes 20a disposed through a metallic housing 20b. The outer housing 20 is disclosed in U.S. Pat. No. 4,850,450, which corresponds to application Ser. No. 122,978, filed Nov. 19, 1987, entitled "Logging Tool Housing with Acoustic Delay", the disclosure of which is incorporated by reference into the specification of this application. In FIG. 6B, the outer housing 20 further includes a plurality of mass loading rings 20c for blocking the transmission of flexural waves propagating up the outer housing 20 from a region in the vicinity of the sonic isolation joint (SIJ) 10b, as shown in FIG. 4. Six mass loading rings 20c are fastened to the first six ring like segments of the outer housing 20. The outer housing 20, itself, behaves like a periodic flexural wave filter for frequencies above approximately 2 KHz. However, the mass loading rings 20c are intended to lower the cutoff frequency from 2 KHz to about 750 Hz, thereby blocking the transmission of higher frequency energy into the remainder of the outer housing 20.

Figure 5:
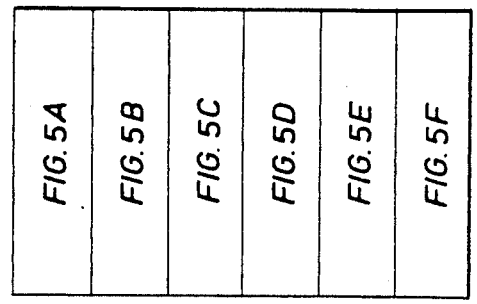
FIG. 5, inclusive of FIGS. 5A–5F, illustrates a detailed construction of the sonic receiver section of FIG. 4.

Referring to FIG. 5, including FIGS. 5A-5F, a detailed construction of the components of the sonic receiver 10c located internally to the housing 20 of FIGS. 6A-6B is illustrated In FIG. 5A, the outer housing 20 is shown as enclosing a metal bulkhead c1, which bulkhead c1 includes a plurality of glass sealed feed-thru "plugs" c2. The outer housing 20 also encloses an air-filled inner space c4 in which a multitude of wires c3 are disposed, which wires are connected to the receiver electronics section 10d shown in FIG. 4. The multitude of wires c3 pass through the glass sealed feed-thru's c2 and continue to pass through an annulus section c5 of the sonic receiver 10c for eventual connection to the hydrophones of the sonic receiver, to be illustrated in more detail below. Because the sonic well tool of the subject invention is subject to very high temperatures and pressures when disposed in a borehole of an oil well, the tool must be encapsulated in oil in order to prevent the tool from being damaged by such extreme pressures. As a result, the annulus section c5 is filled with oil (in contrast, the inner space c4 is air filled, the oil filled annulus section c5 being separated from the air-filled inner space c4 by the glass sealed feed-thru "plug" c2). The outer housing 20 further encloses an inner housing c6, which extends down the length of the receiver section 10d, and a further attenuation member c7 for attenuating flexural and compressional waves propagating down the center part of the sonic receiver 10c. The word "attenuation" is used to connote a reduction in amplitude of the flexural and compressional waves, whereas, in the text below, the word "delay" is used to connote a time delay of the flexural and compressional waves travelling up the receiver 10c from the SIJ 10b and down the receiver 10c from the electronics section 10d. The construction of the attenuation member c7 is identical to the construction of the SIJ 10b (FIG. 4) and includes a plurality of rubber-like washers c7a interleaved with a corresponding plurality of metal-like washers c7b, the washers being enclosed in their own housing c7c. Compressional and flexural waves propagate up from the SIJ 10b along the inner housing c6 or down from the receiver electronics section 10d along the inner housing c6, into the attenuation member c7. The waves are attenuated by the interleaved metal-like washers and rubber-like washers. In FIG. 5A, the inner housing c6 further includes a plurality of bellows sections c6a and a plurality of circumferential support rings c6b interconnecting the plurality of bellows sections c6a. The bellows end fittings interconnect with the teflon mounting blocks c11; as a result, the inner housing c6 cannot rotate circumferentially with respect to the outer housing 20. The support rings c6b have a slight clearance with respect to the outer housing 20; as a result, less acoustic noise is picked up by the hydrophones from the outer housing 20. Furthermore, in FIG. 5A, the bellows section c6a of the inner housing c6 encloses a metal support rod c8 extending longitudinally along substantially the entire length of the sonic receiver 10c. The support rod c8 is designed to support the weight of the sonic receiver 10c when the sonic well tool 10 of FIG. 1 is disposed in the borehole.

Figure 5D:
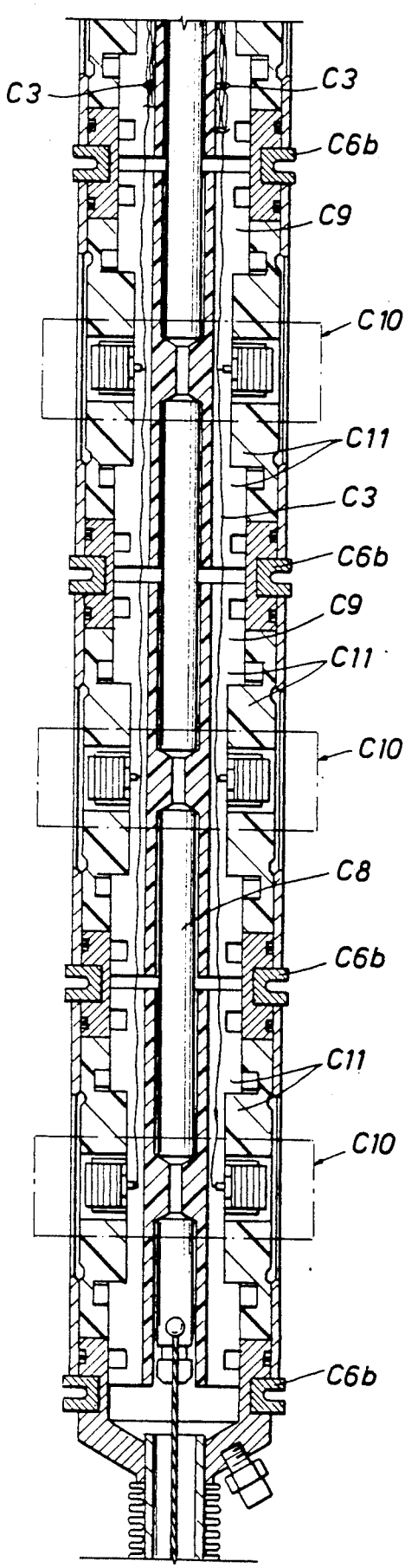
Figure 5E:
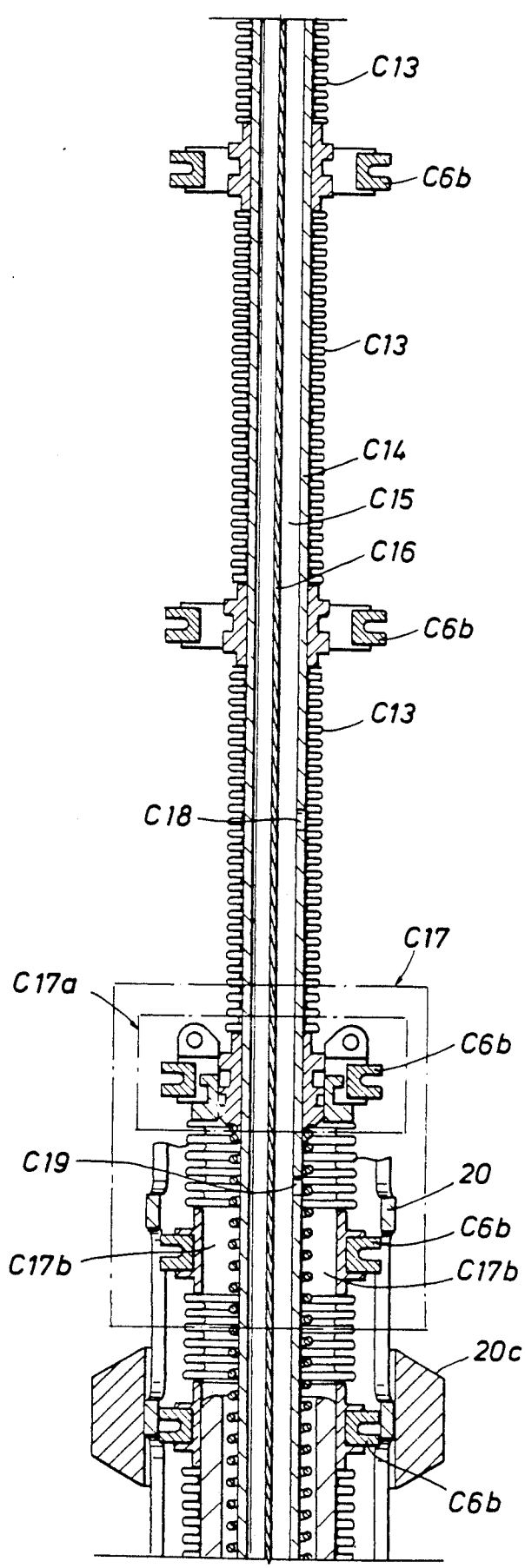
Figure 5B:
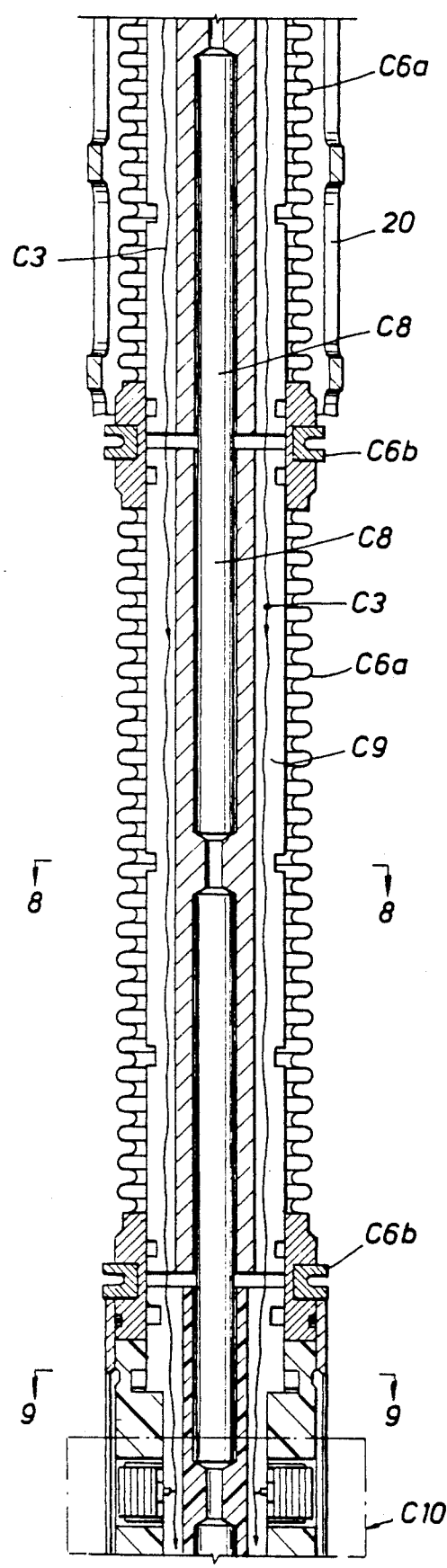

In FIG. 5B, the bellows portion c6a of the inner housing c6 is enclosed by the outer housing 20; note that the outer housing 20 encloses the entire length of the inner housing c6, although, for simplicity of illustration, the outer housing 20, in FIG. 5B, is shown as not enclosing the entire length of the inner housing c6. Each bellows section c6a functions to provide for acoustic compressional and flexural wave propagation delay (time delay) when such waves propagate longitudinally along the inner housing c6 f the sonic receiver. Each bellows section c6a, between adjacent circumferential support rings c6b, has a "corrugated" shape, that is, formed of a plurality of curves or ridges, in order to increase the length of the bellows section c6a of the inner housing c6. The increased length of the bellows section c6a provides for compressional wave propagation delay when the compressional waves propagate longitudinally along the inner housing c6. Each bellows section c6a has a thin transverse dimension (on the order of 10 mils) and each bellows section is loosely and flexibly coupled between adjacent circumferential support rings c6b; the thin dimension (about 10 mils) coupled with the loose and flexible nature of the bellows section c6a functions to cause a slowness in the propagation of flexural waves, when such flexural waves propagate longitudinally along the inner housing c6. A further annulus section c9 is a extension of the annulus section c5 in FIG. 5A, the further annulus section c9 also containing oil. As mentioned above, the sonic well tool 10, and in particular, the receiver section 10c, is encapsulated with oil to protect the tool from the extreme pressures normally experienced by such tools when disposed in oil well boreholes.

Figure 5C:
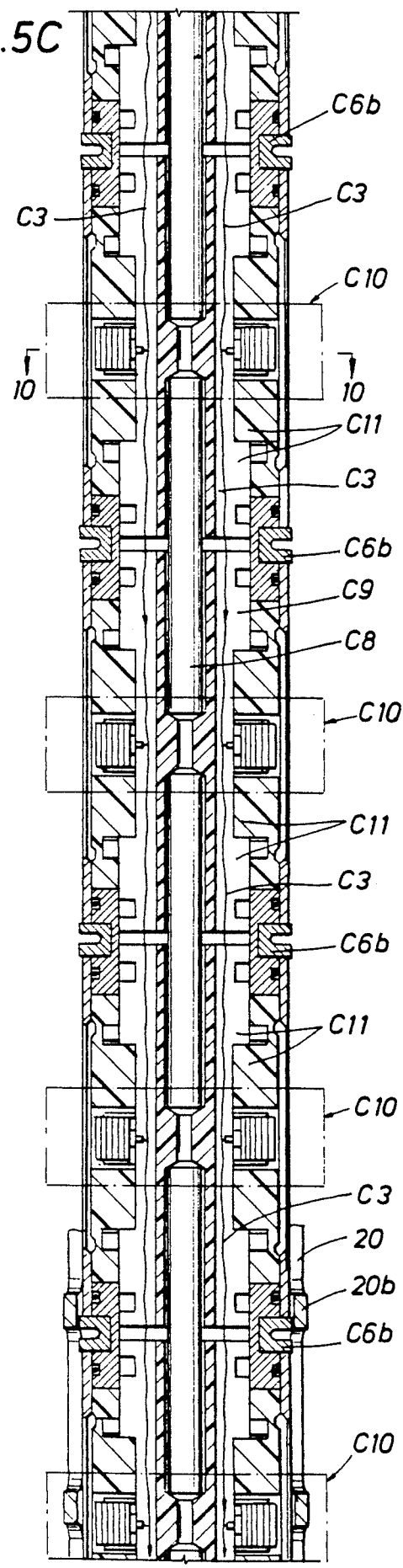

In FIGS. 5B, 5C and 5D, a further section of the sonic receiver 10c of FIG. 1, disposed within the outer housing 20, comprises a hydrophone array, the hydrophone array further including a plurality of hydrophone sets c10, each hydrophone set c10 being supported in place by a pair of teflon mounting blocks c11 and including at least two and preferably four hydrophones, each hydrophone being angularly disposed in cross-section by approximately 90 degrees with respect to its adjacent hydrophone. The multitude of wires c3 pass through the annulus section c5 and the further annulus section c9 for connection to each of the hydrophone sets c10 disposed in the sonic receiver 10c. In addition, as mentioned earlier, the annulus sections c5 and c9 are filled with oil, the oil preventing the receiver 10c from being crushed due to the extreme pressures normally experienced by such well tools when disposed in oil well boreholes.

Figure 10:
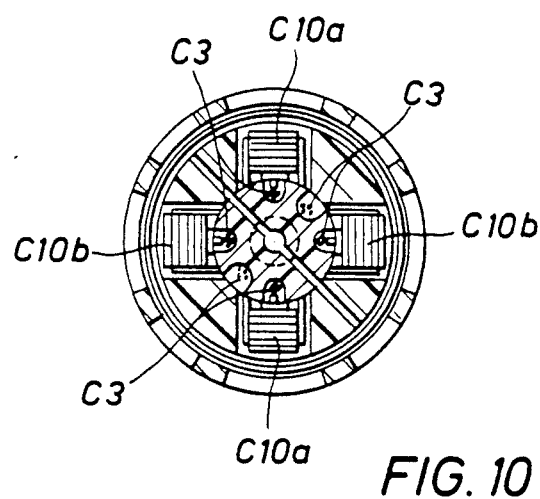
Figure 8:
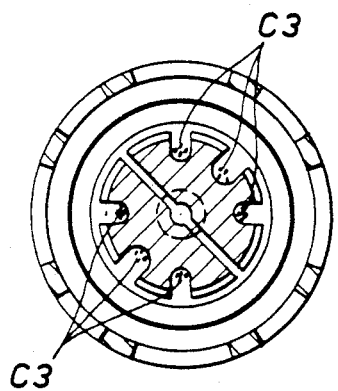
Figure 11:
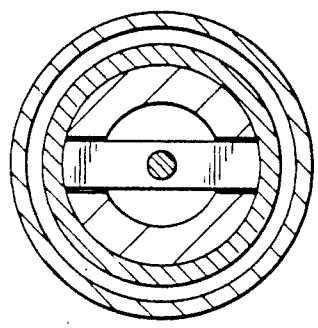
Figure 9:
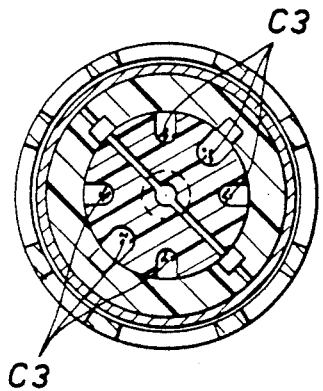

Referring to FIG. 10, a cross-section through a hydrophone set c10 of the sonic receiver 10c, taken along section lines 10—10 of FIG. 5C, is illustrated. In FIG. 10, a hydrophone set c10 includes a first pair of hydrophones c10a and a second pair of hydrophones c10b. As illustrated, each hydrophone is disposed angularly by approximately 90 degrees with respect to its adjacent hydrophone. As illustrated in prior figures, a multitude of wires c3 are disposed in the further annulus section c9 of the receiver 10c for connection to each of the hydrophone sets. FIG. 10 illustrates a plurality of bundles of wires c3, some of the bundles being connected to the first pair of hydrophones c10a and some of the bundles being connected to the second pair of hydrophones c10b.

Referring to FIG. 5D and 5E, a further section of the sonic receiver 10c of the present invention is illustrated. In FIG. 5D and 5E, a further plurality of bellows sections c13 are enclosed by outer housing 20 and are interconnected together by the support rings c6b. The further bellows sections c13 enclose an inner housing c14, the inner housing c14 further enclosing a hollow space c15. Oil is disposed in the hollow space c15 in order to prevent damage to the receiver 10c due to extreme pressures existing in the oil well borehole. A slack cable c16 interconnects the portion of the receiver in FIG. 5D to the portion of the receiver in FIG. 5F, the cable c16 being slack, since it does not support the weight of the tool sections shown in FIGS. 5E–5F, rather, the tool weight is supported by the outer housing 20. As noted with respect to bellows sections c6a, the further bellows sections c13 are corrugated in shape, having a plurality of curves and ridges, for increasing the length of the sections c13 relative to non-corrugated sections, and are thin (on the order of 10 mils) in its transverse dimension. The increased length of sections c13 over non-corrugated sections functions to cause a time delay, delaying the propagation of compressional waves when such compressional waves propagate longitudinally along the length of the bellows sections c13 of the receiver 10c from the SIJ 10b of FIG. 4. The thin transverse dimension (about 10 mils) of the bellows sections c13 functions to slow the propagation of flexural waves (provide a further time delay) when such flexural waves propagate longitudinally along the bellows section c13 of the receiver 10c from SIJ 10b of FIG. 4.

In FIG. 5E, a differential volume compensator c17 is illustrated. The differential volume compensator c17 includes a piston c17a having two working surfaces, a first working surface on the top of the piston c17a and a second working surface on the bottom of the piston c17a. The surface area of the first working surface (the top of the piston) is smaller than the surface area of the second working surface (bottom of the piston). Oil, in hollow space c15 in FIG. 5E, contacts the first working surface, on the top of piston c17a, via port c18; and the oil in hollow space c15 contacts the second working surface, on the bottom of piston c17a, via port c19. If a change in pressure or temperature takes place in the borehole in which the sonic well tool 10 of FIG. 1 is disposed, the oil in hollow space c15 undergoes a change in volume. If the volume of the oil in space c15 decreases, piston c17a will move down in FIG. 5E thereby moving more oil from an annulus area c17b beneath the second working surface of piston c17a into the hollow space c15, via port c19, and compensating for the decrease in the volume of the oil in hollow space c15. However, if the oil volume in hollow space c15 increases, more oil is moved from the hollow space c15 into the annulus area c17b beneath the second working surface of piston c17a, via port c19, thereby compensating for the increase in the volume of the oil.

Figure 5F:
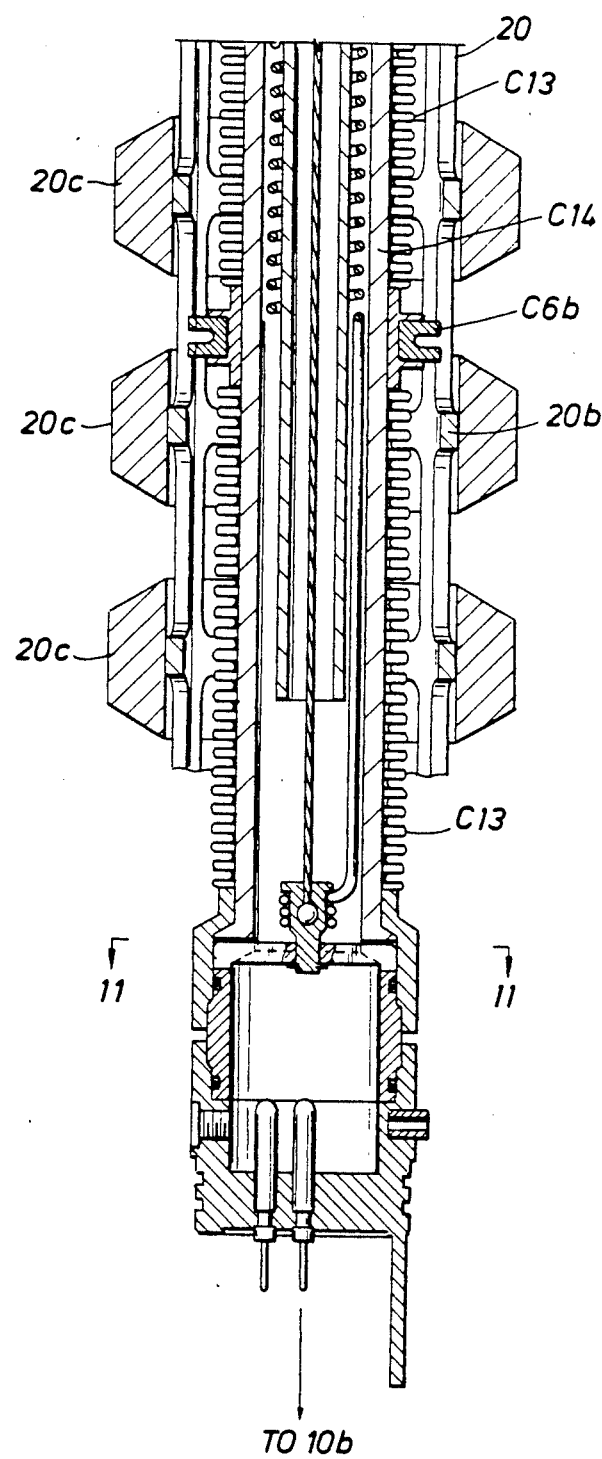
Figure 7:
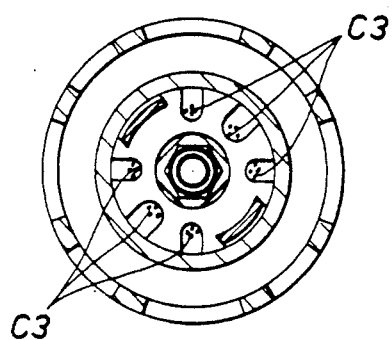
FIGS. 7–11 illustrate various cross sections taken through the sonic receiver section of FIGS. 5A–5F.

In FIG. 5E and 5F, the differential volume compensator c17 is connected to a further section of the receiver 10c which includes the outer housing 20 enclosing an inner portion of the receiver 10c, and a plurality of mass loading rings 20c surrounding and snugly enclosing the outer housing 20 for filtering out flexural waves propagating longitudinally along the outer housing 20 which have a flexural wave frequency between approximately 750 Hz and 2.0 KHz. The inner portion of the receiver 10c, shown in FIG. 5E and 5F, includes the same plurality of bellow sections c13 interconnecting the plurality of support rings c6b and enclosing another inner housing c14, similar to that which is shown in FIG. 5E The corrugated shape of the bellows c13 provides a long length and thereby compressional wave delay, and the thin transverse dimension (width) of the bellows c13 provides flexural wave delay.

FIGS. 7, 8, 9, and 11 represent various cross-sections of the sonic receiver 10c taken along section lines 7—7, 8—8, 9—9 and 11—11 of FIGS. 5A, 5B, and 5F.

Figure 12:
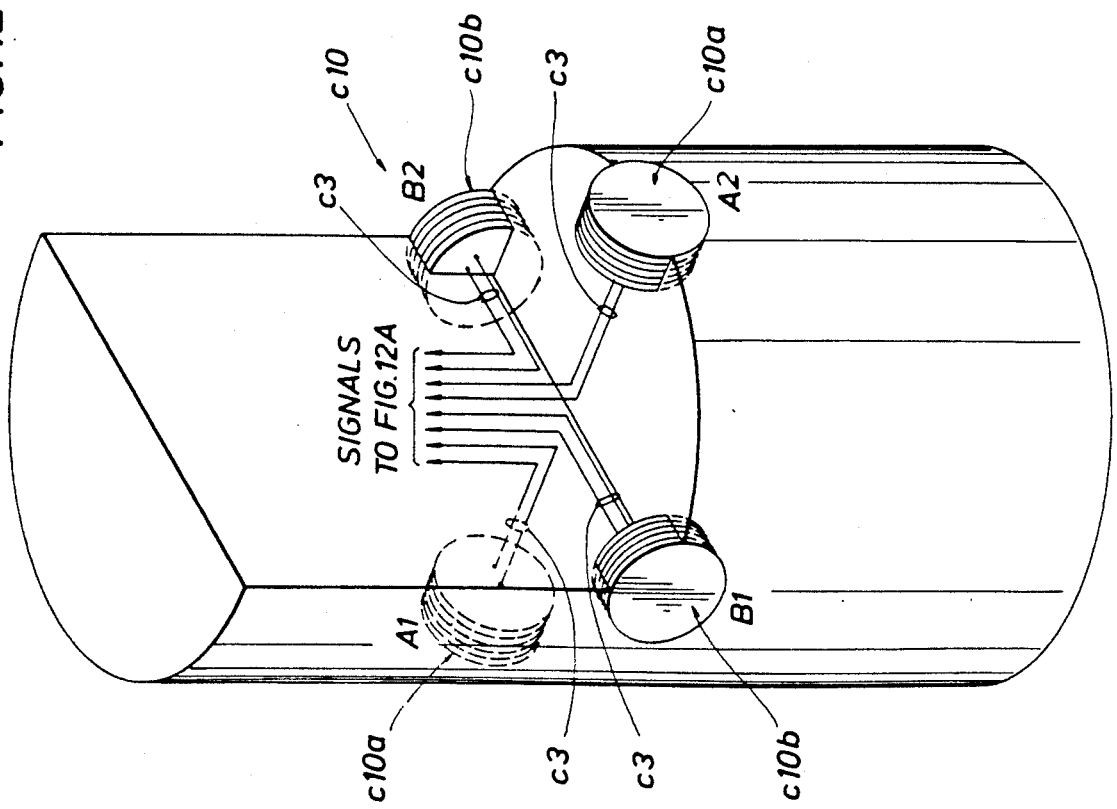
FIG. 12 illustrates a three dimensional view of a hydrophone set shown in FIGS. 5B through 5D.

Referring to FIG. 12, a further construction of the hydrophone set c10 of FIGS. 5B-5D is illustrated. In FIG. 12, a first pair of hydrophones (A—A) c10a are disposed, one opposite the other, in the hydrophone set, and a second pair of hydrophones (B—B) c10b are also disposed, one opposite the other, in the hydrophone set. In the embodiment of FIG. 12, all the hydrophones A—A and B—B are disposed in the same cross-sectional plane of the hydrophone set, each hydrophone being disposed angularly by approximately 90 degrees from each of its adjacent hydrophones. Each hydrophone has two wires connected thereto for propagation longitudinally along the annulus sections c5, c9, c15 to the switching network 10d1 (FIG. 12A) of the receiver electronics section 10d of FIG. 4. The two wires conduct a current to the switching network 10d1 representative of a compressional or shear wave propagating along the formation, the compressional or shear wave originating from either a monopole transmitter a2 or a dipole transmitter a1 of the sonic tool of FIG. 4.

Referring to FIG. 12A, the receiver electronics section 10d of FIG. 4 includes a switching network 10d1 for receiving signals from each of the hydrophones of the hydrophone array of FIGS. 5B-5D, representative of monopole and dipole compressional/shear waves propagating along the formation, and generating an output signal representative of a monopole compressional wave propagating in the formation when the monopole transmitter a2 of FIG. 4 produces the monopole compressional wave of FIG. 2 and for generating an output signal representative of a dipole shear wave propagating in the formation when the dipole transmitter a1 of FIG. 4 produces the dipole shear wave of FIG. 3. The output signals from the switching network 10d1 is transmitted to an acquisition cartridge in either the tool or at the surface. The hydrophone set of FIG. 12 is intended to represent one of the hydrophone sets c10 illustrated in FIGS. 5B-5D.

In FIG. 12A, the switching network 10d1 comprises a plurality of charge preamps d1A connected on one end to a corresponding plurality of hydrophones and, on the other end, to a network of sum and difference amplifiers d1B. The plurality of charge preamps d1A include an A1 preamp A1, an A2 preamp A2, a B1 preamp B1, and a B2 preamp B2. Each preamp A1,A2,B1,B2 receives a charge from its respective hydrophone (receiver transducer) and transforms the charge to a voltage which is input to the sum and difference network d1B. The sum and difference amplifier network d1B receives the inputs from the charge preamps d1A associated with each hydrophone, and, in response thereto, produces monopole outputs associated with the compressional waves produced by the monopole transmitter a2 and produces dipole outputs associated with the shear waves produced by the dipole transmitter a1. In FIG. 12A, seven outputs are generated by the sum and difference network d1B: output 1 is a dipole output, produced by subtracting the output of preamp A2 from the output of preamp A1; output 2 is a dipole output, produced by subtracting the output of preamp B2 from the output of preamp B1; output 3 is a monopole output, produced by adding the output of preamp A2 to the output of preamp A1; output 4 is a monopole output, produced by adding the output of preamp B2 to the output of preamp B1; output 5 is a monopole output, produced by adding the output of preamp B2 to the output of preamp A2; output 6 is a quadrapole output (not used, since this sonic tool does not possess a quadrapole transmitter), produced by subtracting the output of preamp B2 from the output of preamp A2; and output 7 is a monopole output, produced directly from the output of preamp A1. The sum and difference network d1B is connected to a multiplexer d1C. The multiplexer d1C selects one of the seven outputs, output 1 through output 7, in accordance with the binary state of a selection code d1D input to the multiplexer d1C from a controller in the receiver electronics 10d. The output of the multiplexer d1C is a selected sensor characteristic which is directed to the acquisition electronics housed in the receiver electronics 10d.

In operation, referring to FIGS. 12 and 12A, when a dipole transmitter a1 transmits a dipole shear wave into the formation of the borehole, similar to the waves shown in FIG. 3, the hydrophone array senses the existence of the dipole shear waves propagating in the formation. In FIG. 12, hydrophones c10a and c10b of a typical hydrophone set senses the existence of these shear waves, and generates output signals which energize the inputs of the switching network shown in FIG. 12A. Since a dipole shear wave is propagating in the formation, the selection code d1D energizing the multiplexer d1C must indicate the selection of either output 1 or output 2, since both of these outputs are dipole outputs. Therefore, the output of the multiplexer d1C will transmit a dipole characteristic to the receiver electronics 10d, since a dipole transmitter was used to transmit a dipole shear wave into the surrounding formation. Similarly, if the monopole transmitter a2 transmits a monopole compressional wave into the surrounding formation, the hydrophones of a typical hydrophone set (c10a and c10b of FIG. 12 representing a typical hydrophone set) would sense the existence of the monopole compressional wave propagating in the formation and switching network multiplexer d1C must be switched, in accordance with the proper selection code d1D, into order to select either output 3, output 4, output 5, or output 7, all of which are monopole outputs. Therefore, the switching network 10d1 multiplexer d1C switches to the proper output of the sum and difference network d1B in order to select a monopole output when the monopole transmitter a2 is used, and to select a dipole output when the dipole transmitter a1 is used.

Figure 13:
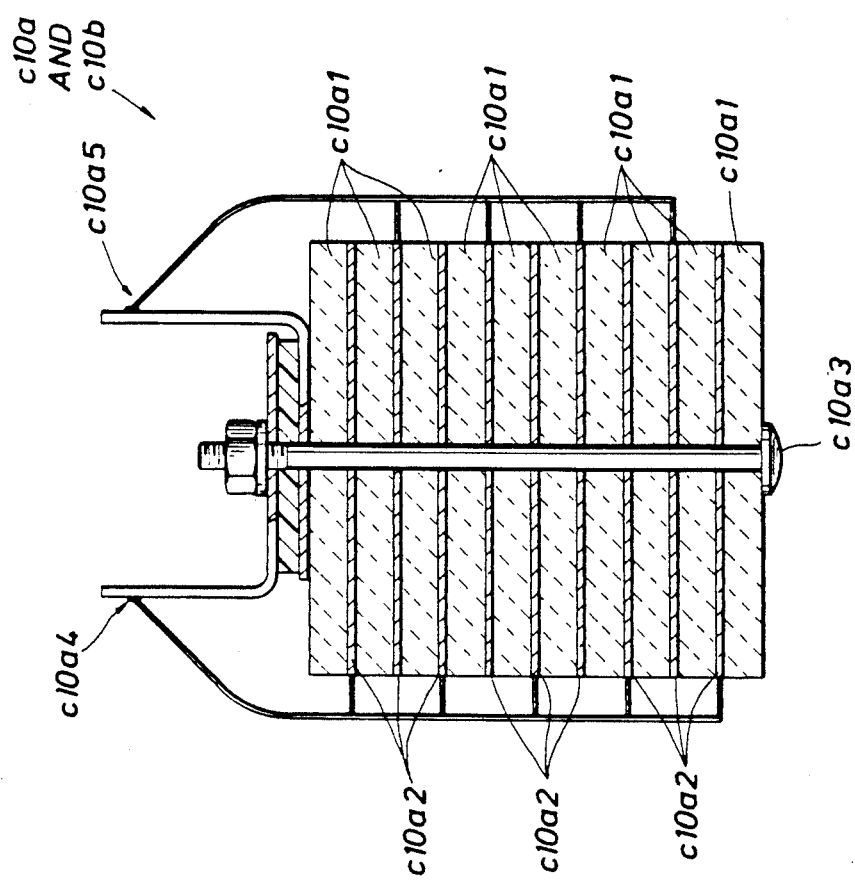
FIG. 13 illustrates a detailed construction of a hydrophone shown in FIGS. 5C, 5D, and 12.

Referring to FIG. 13, a further construction of each hydrophone of each hydrophone set of the hydrophone array of FIGS. 5B-5D, as represented by hydrophones c10a and c10b of FIG. 12, is illustrated.

In FIG. 13, the hydrophones each comprise a plurality of lead metaniobate piezo-ceramic discs c10a1 interleaved with a corresponding plurality of metallic conductive discs c10a2, such as copper discs. A bolt c10a3 is disposed through the hydrophone to hold the interleaved discs together. The first, third, fifth, ... metallic discs c10a2 are connected to one output terminal c10a4 and the second, fourth, sixth, ... metallic discs c10a2 are connected to the other output terminal c10a5 of the hydrophone. In operation, when a shear wave is sensed by the hydrophone, the piezo-ceramic discs c10a1 compress, longitudinally, thereby creating a charge across each piezo-ceramic disc. A positive charge appears on the upper surface of the piezo-ceramic disc and a negative charge appears on the lower surface of the piezo-ceramic disc. Since the one output terminal c10a4 is connected to the first, third, fifth, ... metallic discs and the other output terminal c10a5 is connected to the second, fourth, sixth, ... metallic discs, the charges on the upper surface of each piezo-ceramic disc are added together and appear on the one output terminal c10a4 and the charges on the lower surface of each piezo-ceramic disc are added together and appear on the other output terminal c10a5. As a result, the charge across the output terminals c10a4 and c10a5 are representative of the compressional or shear wave propagating longitudinally along the borehole formation.

Figure 13A:
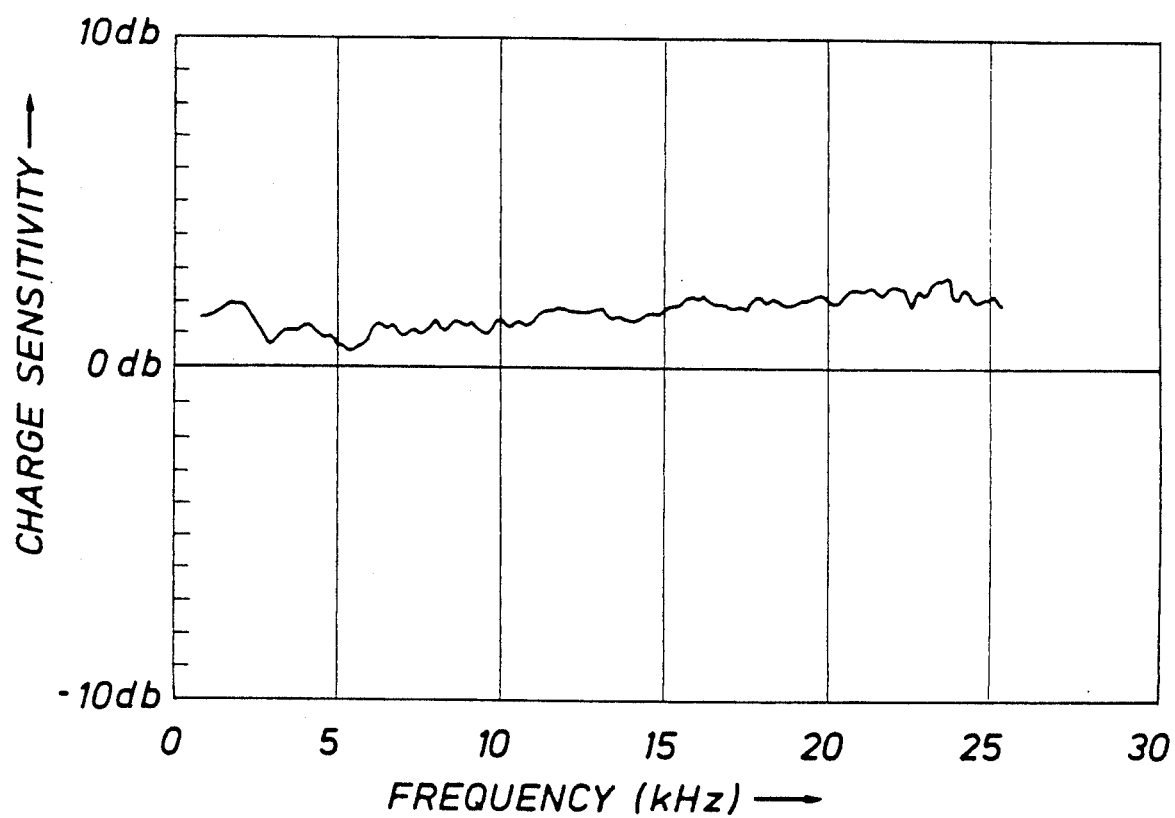
FIG. 13A illustrates a relationship in graphical form of charge sensitivity vs frequency for a hydrophone set.

Referring to FIG. 13A, a plot of charge sensitivity vs frequency for a particular hydrophone set is illustrated.

In FIG. 13A, it is evident that the acoustic response of a typical hydrophone, such as hydrophone c10a/c10b, is inherently wideband and particularly good at low frequencies. As shown in FIG. 13A, the sensitivity is very uniform from 100 Hz to 20 KHz. The center bolt c10a3 of FIG. 13 maintains the piezo-ceramic discs in contact with one another, in spite of high temperatures (up to 350° F.) and high pressures (up to 20,000 psi) normally experienced in a borehole. The sensitivity and capacitance of a particular hydrophone is closely matched with respect to any other hydrophone (to better than 10%), even though the sensitivities and capacitances among the component piezoceramic discs of a particular hydrophone vary by greater than 30%.

A functional description of the sonic well tool transmitter and receiver array of the present invention will be set forth in the following paragraphs with reference to FIGS. 4 through 13.

The sonic monopole and/or dipole transmitters a2 and a1, respectively, transmit a sonic compressional and/or shear wave into the surrounding formation in the borehole and, simultaneously, produce flexural and compressional waves in the body of the sonic tool shown in FIG. 4. The sonic isolation joint 10b attenuates the amplitude of the compressional and flexural waves, as such waves propagate up the tool from the transmitters a1 and a2; however, the SIJ 10b fails to attenuate the waves in their entirety. Some of the flexural and compressional waves continue to propagate up the tool shown in FIG. 4 into the receiver 10c. In FIG. 6B, some of the flexural and compressional waves propagate up the outer housing 20 of the tool. The mass loading rings 20c which surround the lower end of the outer housing 20 filter out some of the flexural waves propagating up the outer housing 20. The outer housing 20, itself, behaves as a periodic flexural wave filter for frequencies above 2.0 KHz. However, the mass loading rings 20c lower the cutoff frequency of a short section of the outer housing 20 to about 750 Hz, thereby blocking the transmission of flexural waves having frequencies between 750 Hz to 2.0 KHz. The flexural and compressional waves which continue to propagate up the outer housing 20 of the tool enter the center of the tool in the vicinity of the attenuation member c7 shown in FIG. 5A and attempt to propagate down along the metal support rod c8; in addition, the flexural and compressional waves enter the tool in the vicinity of the outer housing surrounding the pressure, metal bulkhead c1 and attempt to propagate down the inner housing c6 of the tool receiver 10c shown in FIG. 5A. The attenuation member c7 attenuates the flexural and compressional waves (which emerged from the SIJ 10b) as they propagate through the interleaved rubber like washers c7a/metal like washers c7b before entering the metal support rod c8. The bellows section c6a of the inner housing c6 in FIGS. 5A and 5B delays the flexural and compressional waves, the length of the bellows c6a delaying the compressional waves, the thin width (on the order of 10 mils) or transverse dimension of the bellows c6a delaying the flexural waves, as such waves propagate down the inner housing c6/c6a. Meanwhile, in FIG. 5F, the compressional and flexural waves which emerge from the SIJ 10b propagate up the bellows section c13 in FIG. 5F and up the bellows section c13 in FIG. 5E. However, the bellows section c13 has a corrugated shape designed to provide an increased length of the bellows section c13, thereby delaying the propagation of the compressional waves up the bellows section c13 from the SIJ 10b; in addition, the bellows section c13 is very thin (on the order of 10 mils) in width (transverse dimension), thereby delaying the propagation of the flexural waves up the bellows section c13. As a result of the attenuation member c7 and the bellows c6a in FIGS. 5A and 5B, very little, if any, compressional and flexural waves originating from the top of the sonic well tool 10 reach the hydrophone array in FIG. 5C and 5D, and, as a result of the mass loading rings 20c and the bellows section c13, very little, if any, compressional and flexural waves originating from the bottom of the sonic well tool (the transmitter section a1/a2) reach the hydrophone array in FIGS. 5C and 5D. The hydrophone array will therefore record solely the presence of sonic pressure waves propagating up the formation of the borehole.

Furthermore, since the sonic receiver 10c in FIGS. 5A-5F is encapsulated in oil, any changes in the volume of the oil in response to changes in external pressure or temperature in the borehole will cause the differential volume compensator c17 in FIG. 5E to adjust the position of piston c17a; when the position of piston c17a adjusts accordingly in response to a change in the volume of oil in hollow space c15, either one of two actions take place: (1) more oil from annular area c17b in FIG. 5E enters hollow space c15, or (2) more oil from hollow space c15 enters annular area c17b; as a result, the oil in hollow space c15 is maintained at a constant pressure; a constant pressure of oil in hollow space c15 (in addition to spaces c9 in FIGS. 5B and 5C and space c5 in FIG. 5A) is necessary in order to protect the sonic well tool 10 (and in particular, the receiver area 10c) from the extreme pressures normally experienced by well tools when disposed in oil well boreholes.

In the meantime, compressional/shear waves are propagating in a longitudinal direction along the borehole, from the transmitter 10a to the receiver 10c. When a shear wave arrives at a portion of the borehole adjacent hydrophone pairs A—A c10a and hydrophone pairs B—B c10b, each of the piezo-ceramic discs c10a1 of the hydrophones c10a and C10b compress in the longitudinal direction, thereby creating a charge across each piezo-ceramic disc. A first output terminal c10a4 of each hydrophone is connected to every first, third, fifth, . . . , metallic discs c10a2 and a second output terminal c10a5 of each hydrophone is connected to every second, fourth, sixth, . . . metallic discs c10a2. Therefore, the output terminals of the four hydrophones A—A and B—B (c10a and c10b) have charges, the magnitudes or amplitudes of which are proportional to the magnitude or amplitude of the compressional or shear wave propagating along the borehole. The multitude of wires c3 from each hydrophone carry the voltage to the switching network 10d1 shown in FIG. 12A. The charge preamps d1A convert the charges to voltages, which voltages are input to the sum and difference network d1B. By suitably adding and subtracting the outputs of the charge preamps A1,A2,B1,B2, monopole and dipole outputs (output 1 through output 7, minus output 6) are generated from the sum and difference network d1B. A selection code d1D is generated by a controller, the selection code being generated corresponding to the particular sonic transmitter being used. For example, if a monopole transmitter was used, the selection code d1D corresponding to a monopole transmitter is generated, the selection code d1D selecting either output 3, output 4, output 5, or output 7. If a dipole transmitter was used, the selection code d1D corresponding to a dipole transmitter is generated, the selection code d1D selecting either output 1 or output 2 of the sum and difference network d1B. As a result, the multiplexer d1C selects a dipole output when the dipole transmitter is used, and selects a monopole output with the monopole transmitter is used. The output from the multiplexer d1C is input to the acquisition electronics in the receiver electronics 10d.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A monopole transmitter, comprising:
   an axial tube supported at each end by respective first and second bulkheads;
   a piezoceramic cylinder surrounding said axial tube and located intermediate said first and second bulkheads, said cylinder being closed at each end by respective first and second endcaps; and
   means for holding said endcaps firmly against said axial tube and away from said respective bulkheads wherein said holding means comprises spring washer means disposed between said first bulkhead and said first endcap for biasing said first endcap against said cylinder and away from said first bulkhead.

2. The monopole transmitter of claim 1, further comprising:
   driving means connected to the piezoceramic cylinder for energizing said cylinder thereby expanding said cylinder radially and axially, said driving means including memory means for storing digital data, means for accessing said memory to retrieve some of said digital data and generating output signals representative of said digital data, and means for converting said digital data to analog data, said analog data energizing said cylinder and expanding said cylinder radially and axially.

3. A monopole transmitter, comprising:
   an axial tube supported at each end by respective first and second bulkheads;
   a piezoceramic cylinder surrounding said axial tube and located intermediate said first and second bulkheads, said cylinder being closed at each end by respective first and second endcaps; and
   means for holding said endcaps firmly against said axial tube and away from said respective bulkheads wherein said holding means comprises a nodal mount on said axial tube, said cylinder and said endcaps being disposed coaxially around said nodal mount, and spring means disposed between said nodal mount and each of said endcaps for biasing said endcaps in tension against said nodal mount.

4. The monopole transmitter of claim 3, further comprising:
   driving means connected to the piezoceramic cylinder for energizing said cylinder thereby expanding said cylinder radially and axially, said driving means including memory means for storing digital data, means for accessing said memory to retrieve some of said digital data and generating output signals representative of said digital data, and means for converting said digital data to analog data, said analog data energizing said cylinder and expanding said cylinder radially and axially.

5. A monopole transmitter, comprising:
   an axial tube supported at each end by respective first and second bulkheads;
   a nodal mounting tube disposed coaxially around said axial tube and fixedly secured thereto intermediate said first and second bulkheads;
   a piezoceramic cylinder surrounding and coaxial with said nodal tube, said cylinder being closed at each end by respective first and second endcaps; and
   means for holding said endcaps firmly against said nodal tube and away from said respective bulkheads wherein said holding means comprises ring means disposed on said nodal tube outside each end of said cylinder, the holding means including spring means disposed between each said ring means and a respective endcap outside of said cylinder for biasing each endcap in tension against a ring means.

6. The monopole transmitter of claim 5, further comprising:
   driving means connected to the piezoceramic cylinder for energizing said cylinder and thereby expanding said cylinder radially and axially, said driving means including memory means for storing digital data, means for accessing said memory to retrieve some of said digital data thereby generating output signals representative of said digital data, and means for converting said digital data to analog data, said analog data energizing said cylinder and expanding said cylinder radially and axially.

* * * * *